United States Patent [19]

Rehrig

[11] Patent Number: 4,736,098
[45] Date of Patent: Apr. 5, 1988

[54] SIGNALLING METHOD AND APPARATUS FOR A CONVENTIONAL SHOPPING CART

[75] Inventor: Houston Rehrig, Pasadena, Calif.

[73] Assignee: Rehrig International, Vernon, Calif.

[21] Appl. No.: 827,439

[22] Filed: Feb. 10, 1986

[51] Int. Cl.$^4$ .............................................. G08B 13/18
[52] U.S. Cl. ................................. 250/222.1; 340/568; 186/62
[58] Field of Search ..................... 250/222.1, 221, 561, 250/231 R, 229; 340/555–556, 568, 600, 666; 186/19–20, 62; 280/47.26

[56] References Cited

U.S. PATENT DOCUMENTS

| | | | |
|---|---|---|---|
| 3,457,423 | 7/1969 | Gravely | 186/62 |
| 3,725,894 | 4/1973 | Geisler | 340/568 |
| 4,327,819 | 5/1982 | Coutta | 340/568 |
| 4,338,594 | 7/1982 | Holm | 340/556 |

Primary Examiner—Edward P. Westin
Attorney, Agent, or Firm—Banner, Birch, McKie & Beckett

[57] ABSTRACT

A signalling device for detecting and signalling the presence of articles on the bottom package tray (20) of a shopping cart as the shopping cart is moved through an aisle adjacent a checkout station (72) comprises a pair of springs (40, 42) positioned at the forward end of tray (20) and operative to bias tray (20) in an upper position relative the frame of the cart. A photoelectric assembly (70) is positioned at a checkout station (72) and directs a beam of light (74) across the path of the shopping cart as the cart is moved alongside checkout station (72). A reflector (60) is mounted on bottom tray (20) proximate the rear end thereof and is oriented to reflect light directed toward one side of the cart. Reflector (60) is normally biased in an upper postion and is movable to a lowered position in the path of light beam (74) when an article is placed on tray (20). Photoelectric assembly (70) is operative to receive light reflected from reflector (60) and is responsive thereto to activate signal means located at the checkout station to indicate to the checkout attendant that merchandise is present on tray (20). A method for adapting an existing shopping cart for use with a signalling device for detecting and signalling the presence of articles on the bottom package tray of the cart includes the steps of hinging the tray to the frame to permit vertical movement of the tray and spring biasing the forwrad end of the tray to normally maintain the tray in an elevated position and to permit the tray to move to a lower position when an article is placed on the tray. A reflector is releasably coupled to the tray and oriented to reflect light directed at it from the signalling device.

14 Claims, 2 Drawing Sheets

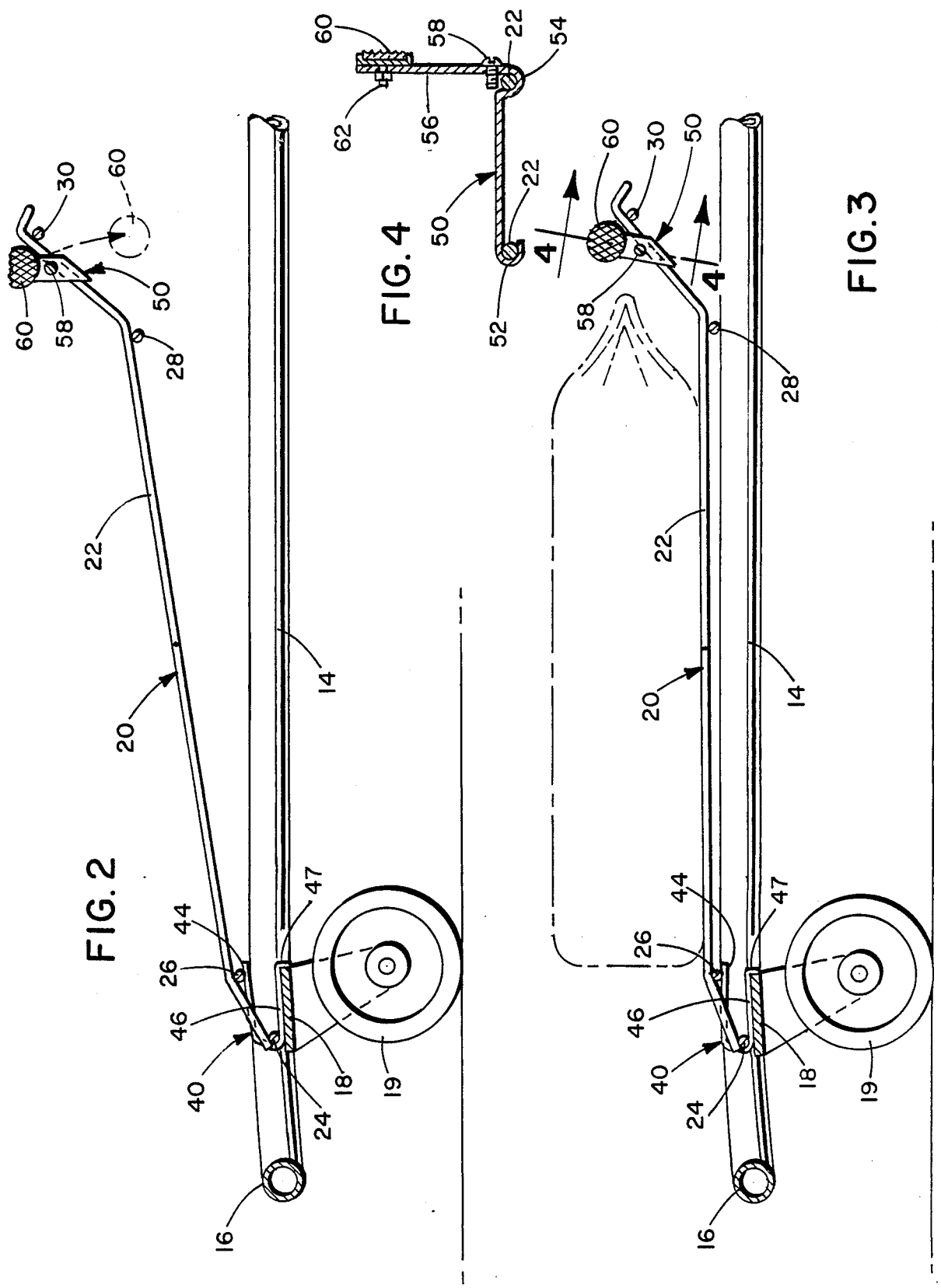

SIGNALLING METHOD AND APPARATUS FOR A CONVENTIONAL SHOPPING CART

TECHNICAL FIELD

This invention relates to shopping carts generally and more specifically to a signalling method and apparatus for detecting and signalling the presence of articles on the bottom package tray of a shopping cart.

BACKGROUND OF THE INVENTION

Shopping carts of the kind commonly in use today typically include an upper basket for receiving goods to be transported to a checkout station and a bottom package tray positioned beneath the basket and supported on the base portion of the shopping cart frame. The bottom tray provides additional transport space and is conveniently used for storing bulkier, heavier items. Though provision of a bottom tray, by providing more transport space, allows customers to increase their purchases and thus theoretically encourages larger sales, it can also lead to significant losses to store owners. Because the tray is not readily observable by the checkout attendant, items placed on the tray are often left unpaid for, resulting in significant losses of sales revenue.

The present invention improves upon that situation by providing a signalling device that can be easily coupled onto an existing shopping cart to detect the presence of articles on the bottom package tray of the cart and to automatically siganl the checkout attendant that merchandise is present on the tray. The present signalling device is also relatively simple in construction and thus can be easily and inexpensively fabricated.

Various signalling systems have been previously proposed, but those systems have not been designed for use with existing shopping carts. They have thus required extensive and expensive modifications to the conventional shopping cart and have typically also involved substantial fabrication costs. One such system described in U.S. Pat. No. 4,327,819 to Coutta involves use of a specially designed plastic tray which replaces the bottom tray of the conventional shopping cart. In the Coutta system, the shopping cart is modified so that the existing bottom tray is either removed completely or overlaid with the specially designed plastic tray.

The present invention improves upon the prior art systems by providing a signalling method and device that can be conveniently used on existing shopping carts without requiring any need for costly modifications. It thus provides a practical, cost-effective system for preventing store losses, which has not heretofore been provided by any of the prior art systems.

SUMMARY OF THE INVENTION

The present invention described and disclosed herein comprises a signalling device and method for detecting the presence of articles on the bottom tray of a shopping cart and for indicating the same to the attendant at a checkout station. The device is designed for use on shopping carts of the kind commonly known and can be conveniently used on existing carts without any need for costly modifications.

More specifically, the signalling device comprises a pair of springs positioned at the forward end of the bottom tray between the tray and cart frame for biasing the tray in an elevated position with respect to the frame. A reflector is coupled to the bottom tray proximate the rear end thereof and is oriented to reflect light directed toward one side of the cart. The reflector is normally maintained in an elevated portion by the springs and is shifted to a lower position when an article is placed on the tray.

A photoelectric assembly is positioned at the checkout station adjacent the path of a shopping cart and includes a light source for directing a beam of light across the cart path. The light source is positioned at a selected elevation so that as the shopping cart is moved alongside the checkout station, the light beam will pass below the reflector when the tray is in the upper position and will contact the reflector when the tray is deflected to a lower position by the weight of an article placed on the tray.

The photoelectric assembly also includes a detector positioned adjacent the light source which receives light reflected from the reflector when the tray is in the lowered position and generates an output signal to activate signal means, e.g., a light, audible transducer, at the checkout station for indicating that an article is present on the tray.

A method for adapting a conventional cart for use with the signalling device includes the steps of hinging the bottom package tray to the cart frame and spring biasing the forward end of the tray to permit movement of the tray between an elevated position and a lowered position when an article is placed on the tray. A reflector is releasably coupled on the rear portion of the tray and is oriented to reflect light directed from one side of the cart to signal the presence of articles on the tray.

DESCRIPTION OF THE DRAWINGS

A more complete understanding of the invention can be had by reference to the following detailed description taken in conjunction with the accompanying drawings in which:

FIG. 2 is a partial side view of the shopping cart frame shown in FIG. 1 and illustrates the bottom tray in an elevated position;

FIG. 3 is another partial side view of the shopping cart frame of FIG. 1 and shows the bottom tray in a deflected position under the weight of an article present on the tray; and FIG. 4 is a sectional view of the bracket mounted at the rear of the bottom tray taken along line 4—4 of FIG. 3.

DETAILED DESCRIPTION OF THE INVENTION

Figure 1:
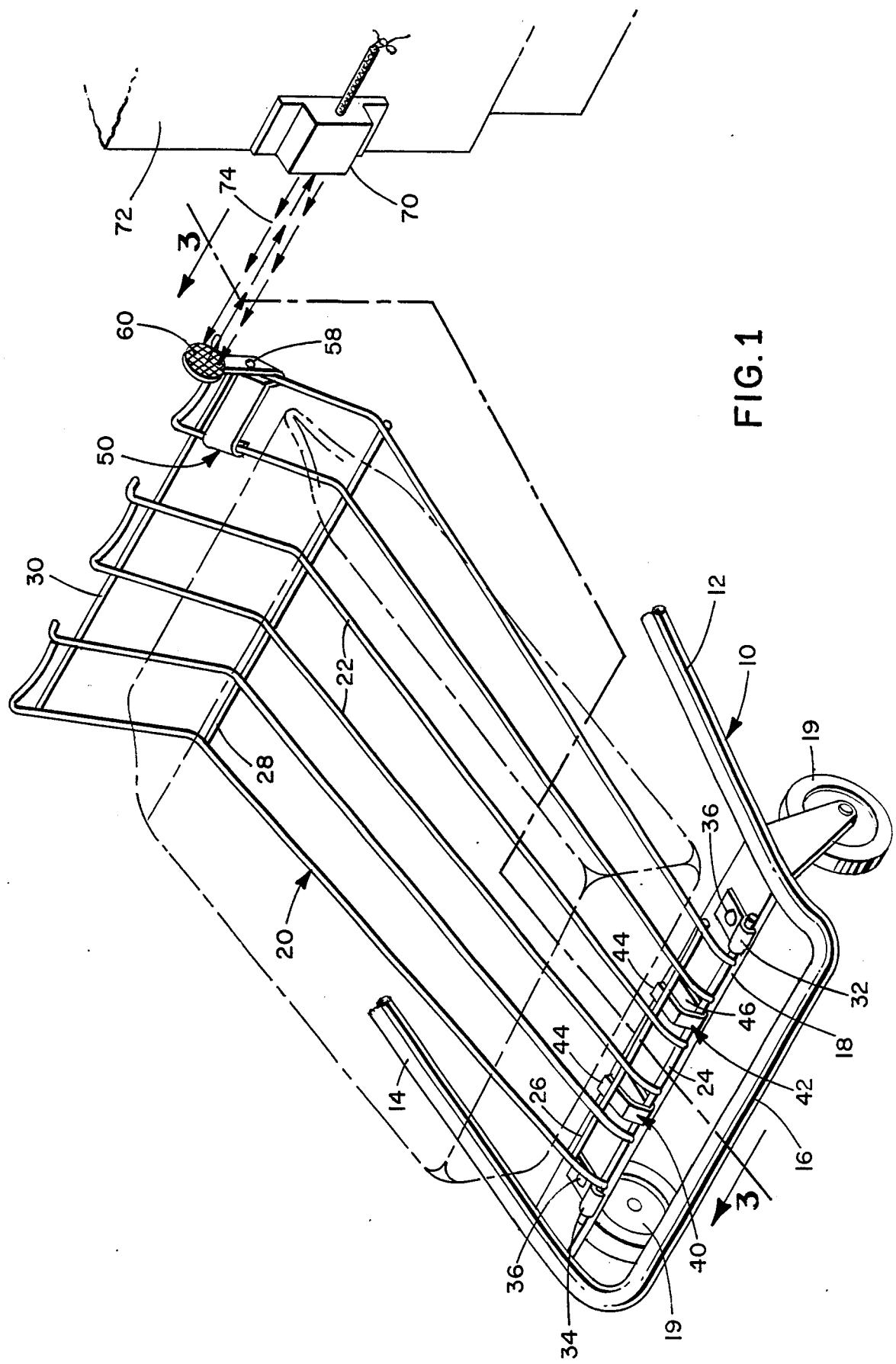
FIG. 1 is a perspective view of the signalling device of the present invention.

Referring now to the drawings wherein like reference numerals designate like or corresponding parts throughout, FIG. 1 illustrates the base portion of the frame of a shoping cart incorporating the features of the present invention. As shown in FIG. 1, the base portion comprises a tubular chassis 10 having side members 12 and 14 joined together by a front member 16 and a caster support plate 18 fixedly attached to the side members.

A pair of front casters 19 are attached to caster support plate 18 and comprise a caster member having a wheel mounted therewith. A bottom package tray 20 is supported between side members 12 and 14 and comprises a plurality of wires 22 connected at one end by a pivot wire 24 and a support wire 26 and at the other end by support wires 28 and 30. Tray 20 is pivotally coupled to caster support plate 18 by hinges 32 and 34. Hinges 32 and 34 engage pivot wire 24 at opposite ends thereof and are fastendd to tray 20 and caster support plate 18 by rivets 36. The hinges allow downward pivotal movement of tray 20 when merchandise is placed on the tray, as explained hereinafter, and also permit tray 20 to pivot upwardly to allow a plurality of carts to be nested. As shown in the figure, the rearward portions of wires 22 are oriented upwardly at an angle to side members 12 and 14 so that when the carts are nested, contact by front member 16 of an adjacent cart causes tray 20 to be pivoted upwardly for nesting.

Springs 40 and 42 are also provided and are positioned at the forward end of tray 20 between tray 20 and caster support plate 18 to thus bias tray 20 in an elevated position relative chassis 10, as best seen in FIG. 2. As shown in FIGS. 1 and 2, each of springs 40 and 42 is substantially U-shaped and comprises a first leg member 44 and a second leg member 46 integrally coupled thereto at one end thereof and disposed relative to leg member 44 at an acute angle. In use, each of springs 40 and 42 is snap-fitted onto tray 20 so that pivot wire 24 is received between leg members 44 and 46. The leg members then extend beneath support wire 26 with leg member 46 being positioned below leg member 44 and contacting the top surface of caster support plate 18. The free end 47 (FIGS. 2 and 3) of leg member 46 is deflected downwardly at a right angle and fitted around the edge of caster support plate 18 to contact the rear surface thereof. Leg member 44 extends above leg member 46 and contacts the underside of support wire 26 to thus bias tray 20 in an elevated position (FIG. 2). This design permits a releasable snap fit so that springs 40 and 42 can be easily coupled onto an existing cart.

A bracket 50 is releasably mounted proximate the rear of tray 20 at one side thereof and is fitted onto a pair of adjacent wires 22. Bracket 50 is preferably constructed of metal and, as best shown in FIGS. 1 and 4, comprises a generally rectangular plate having curved portions at its opposite ends. One of the curved portions is looped toward the underside of bracket 50 to form a hook 52 for snap-fitting onto one of wires 22 and the other portion is looped downwardly toward the underside of bracket 50 and then upwardly to define a channel 54 in which an adjacent wire 22 is received and an upwardly projecting arm 56. Bracket 50 is secured in place by a screw 58 which extends through an opening in arm 56 to bridge channel 54. Screw 58 permits bracket 50 to be releasably coupled to wires 22.

A reflector 60 is mounted on the outwardly facing side surface of arm 56 proximate the upper end thereof and is secured to arm 56 by a bolt 62 which extends through an opening located proximate the center of reflector 60. Other suitable means can also be used for securing reflector 60 to arm 56. Reflector 60 is preferably a multifaceted prism and is oriented to reflect light directed to it from a photoelectric assembly 70 located at one side of the cart, as explained hereinafter in greater detail. Reflector 60 is normally maintained with tray 20 in an elevated position (FIG. 2) by springs 40 and 42 and is moveable with tray 20 to a lowered position when an article is placed on the tray (FIG. 3).

Referring again to FIG. 1, a photoelectric assembly 70 is shown mounted on a checkout station 72 adjacent the path of the cart. Photoelectric assembly 70 is of conventional design and includes a light source for directing a beam of light 74 at a selected elevation across the path of the shopping cart. Photoelectric assembly 70 also includes a detector adjacent the light source for receiving light reflected from reflector 60 and for genertng an electrical output signal in response thereto to activate signal means (not shown) located at the checkout station for indicating that an article is present on tray 20.

In use, when no merchandise is present on tray 20, the tray is normally biased by springs 40 and 42 in an upper position and reflector 60 is also maintained in the elevated position (FIG. 2). The elevation of the light source of photoelectric assembly 70 is selected so that light beam 74 is positioned below reflector 60 when the tray is in the upper position. Thus, when no merchandise is present on the tray, reflector 60 remains outside the path of light as the cart is moved past the checkout station and no electrical contact will occur.

On the other hand, when goods are placed on tray 20, springs 40 and 42 are compressed by the weight of the goods and tray 20 and reflector 60 are deflected to a lowered position (FIG. 3). In the lowered position, reflector 60 is disposed opposite the light source and intercepts light path 74 as the cart proceeds past the checkout station. Reflector 60 thus causes light to be reflected which is detected at photoelectric assembly 70 to thus signal the presence of goods on tray 20. In the preferred embodiment, photoelectric assembly 70 provides an electrical output signal responsive to receipt of reflected light which is operative to activate signal means (not shown), e.g., a light, audible transducer, present at the checkout station to indicate to the checkout attendant that merchandise is present on the bottom tray.

Springs 40 and 42 are preferably steel and are designed to support tray 20, in the absence of merchandise, without any significant deflection. In the preferred embodiment, springs 40 and 42 will maintain the tray in an elevated position until at least approximately one pound of weight is added to the tray. Springs 40 and 42 can take other forms and composition which will allow snap fitting to facilitate connection to existing carts.

The signalling device of the present invention, as described above, can be easily incorporated into an existing cart without excessive costs in the following manner. In many conventional carts, pivot wire 24 includes downwardly and forwardly turned portions at its opposite ends that are received in openings in caster support plate 18 to anchor tray 20 at its forward edge to caster support plate 18. In other conventional carts, pivot wire 24 extends across the entire width of chassis 10 so that its opposite ends are received in openings in side members 12 and 14 to permit some pivotal movement of tray 20.

To customize the first type of conventional cart discussed above for use with the present signalling device, pivot wire 24 is disengaged from the openings in the caster support plate and is then extended horizontally and hinged at its opposite ends to the top surface of caster support plate 18 by hinges 32 and 34, substantially as shown in FIG. 1. Similarly, in the case of a cart of the second type, the pivot wire is disengaged from side members 12 and 14 and hinged at its opposite ends to caster support plate 18 by hinges 32 and 34, again, as shown in FIG. 1. In some cases, however, where there is sufficient pivotal movement available about side members 12 and 14, it may not be necessary to reconnect pivot wire 24 to hinges 32 and 34.

Once tray 20 has been hinged onto caster support plate 18, springs 40 and 42 are releasably snap-fitted between the tray and frame to thus bias the tray in an elevated position. Bracket 50 is releasably clamped onto a pair of adjacent wires 22 so that one of the wires is received within hook 52 and the other wire is positioned in channel 54. Screw 58 is then passed through an opening in arm 56 to hold bracket 50 in place. Reflector 60 is coupled to tray 20 by amounting the reflector at the upper end of arm 56 and screw 62 is passed through an opening in the center of the reflector to thus secure reflector 60 onto bracket 50.

Although the preferred embodiment has been described in detail, it should be understood that various changes, substitutions and alterations can be made therein without departing from the spirit and scope of the invention as defined by the appended claims.

I claim:

1. A method for adapting a conventional shopping cart having a basket for receiving goods to be transported to a checkout station and a conventional bottom package tray positioned beneath the basket and pivotably coupled to the base portion of the shopping cart frame for upward movement to permit use of the shopping cart with a signalling device for detecting and signalling the presence of articles on the bottom package tray, comprising the steps of:

spring biasing the forward end of the bottom package tray to normally maintain said tray in an elevated position relative to the shopping cart frame and to permit movement of said tray between said elevated position and a lower position when an article is placed on the tray; and coupling a reflector to said tray for movement therewith, said reflector being oriented and adapted for use with said signalling device so that energy directed from the signalling device toward the cart contacts the reflector when the tray is in the lower position and is reflected by the reflector back to the signalling device which singals the presence of articles on the tray.

2. The method of claim 1 wherein the step of coupling said reflector comprises the step of releasably clamping said reflector to said tray.

3. The method of claim 1 wherein the step of spring biasing comprises the positioning of a plurality of springs in a spaced apart relationship at the forward end of the shopping cart frame, each of said springs being releasably coupled between said tray and the frame.

4. In a conventional shopping cart having a basket for receiving goods to be transported to a checkout station and a conventional bottom package tray positioned beneath the basket and pivotably coupled to the base portion of the shopping cart frame for upward movement, a bottom tray signalling device for use with an article detecting system for detecting the presence of articles on the bottom package tray comprising:

spring bias means positioned near the forward end of the bottom package tray to normally maintain said tray in an elevated position relative to the shopping cart frame and to permit movement of said tray between said elevated position and a lower position when an article is placed on said tray; and reflector coupling means for coupling a reflector to said tray; said reflector being oriented and adapted for use with said detecting system so that energy directed from the article detecting system toward the cart contacts the reflector when the tray is in the lower position and is reflected to the article detecting system which signals the presence of articles on the tray.

5. The device of claim 4 wherein said spring bias means comprises a plurality of springs in a spaced apart relationship at the forward end of the shopping cart frame, each of said springs being releasably coupled between said tray and the frame.

6. In a conventional shopping cart having a basket for receiving goods to be transported to a checkout station and a conventional bottom package tray positioned beneath the basket and pivotably coupled to the base portion of the shopping cart frame for upward movement, a signalling device for detecting and signalling the presence of articles on the bottom package tray as the shopping cart is moved through an aisle adjacent the checkout station comprising:

spring bias means positioned near the front end of the bottom package tray for supporting the tray in an elevated position relative the frame of the cart;

reflector means coupled to said tray and oriented to reflect energy directed from an energy source toward one side of the cart, said reflector means being normally maintained with said tray in an elevated position by said spring bias means and movable with said tray to a lower position when an article is placed on the tray;

a source of energy located on one side of the aisle for directing a beam of energy across the aisle in the path of the shopping cart as the cart is moved alongside the checkout station, said energy source being positioned so that the beam passes below said tray when the tray is in the elevated position and contacts said reflector means when said tray is deflected to a lower position by the weight of an article placed on the bottom tray; and detector means positioned adjacent said energy source for receiving the beam reflected from said reflector means when said tray is in the lower position and for generating an output signal in response thereto.

7. The signalling device of claim 6 wherein said spring bias means comprises a pair of springs positioned in a spaced apart relationship and releasably coupled between said tray and the frame of the shopping cart.

8. The signalling device of claim 6 wherein said reflector means is mounted on a bracket adapted to be releasably clamped onto said tray.

9. The signalling device of claim 6 wherein said reflector means is a multifaceted prism.

10. The signalling device of claim 6 wherein said energy source and said detector means are positioned on the side surface of the checkout station.

11. The signalling device of claim 6 wherein said spring bias means maintains said tray and said reflector means in the elevated position until approximately one pound of weight is placed on the tray.

12. The signalling device of claim 6 wherein said energy is radiant energy.

13. The signalling device of claim 7 wherein said tray comprises a plurality of spaced apart wires extending rearwardly along the length of the cart frame and connected at the front end by a laterally extending pivot wire and a support wire.

14. The signalling device of claim 13 wherein each of said springs comprises a first leg member and a second leg member integrally connected to said first leg member at one end thereof and disposed relative to said first leg member at a predetermined angle, each of said springs being coupled between said tray and the cart frame so that said pivot wire is received between said first leg member and said second leg member and said first leg member and said second leg member are positioned beneath said support wire so that said second leg member is positioned adjacent the cart frame and said first leg member is positioned thereabove adjacent the underside of the support wire.

* * * * *